May 20, 1952 E. J. McDANIEL ET AL Re. 23,495

SHOE LAST

Original Filed Oct. 12, 1948

INVENTOR.
ESKEL J. McDANIEL
ARTHUR R. SUMMERS
Bertram H. Manny
ATTORNEY

Reissued May 20, 1952

Re. 23,495

UNITED STATES PATENT OFFICE 23,495

SHOE LAST

Eskel J. McDaniel and Arthur R. Summers,
St. Louis, Mo.

Original No. 2,484,351, dated October 11, 1949,
Serial No. 54,176, October 12, 1948. Application
for reissue June 10, 1950, Serial No. 167,432

8 Claims. (Cl. 12—136)

Matter enclosed in heavy brackets [ ] appears in the original patent but forms no part of this reissue specification; matter printed in italics indicates the additions made by reissue.

This invention relates to shoe lasts and consists in novel means for strengthening the last to resist lateral and pivotal pressures applied thereto during the use of the last to form a shoe upper. *This is an application for reissue of our Patent No. 2,484,351 which resulted from an application Serial No. 54,176, filed October 12, 1948,* a continuation in part of [my] *our* application, Serial No. 742,528, filed April 19, 1947, now forfeited.

Very great pressures are applied to the separately formed toe and heel parts of the last during the shoemaking process tending to break the last about the dividing line between the toe and heel parts. The parts are held in their normal functioning positions by means of links and latches or detents but, in the past, these have been inaccurately or ineffectively constructed so as to permit a slight play in the link pivots or latch with consequent straining and occasional breakage of the parts.

An object of the present invention is to provide a shoe last having novel features which firmly and accurately secure the separable last parts in their normal functioning positions, yet which may be easily manipulated by the operator to shorten the longitudinal dimension of the last and thereby permit its removal from the shoe.

Another object is to provide swivelling means for the last heel and toe parts which are more accurately and durably constructed than previous parts designed for the same purpose and which are secured to the last parts so as to minimize the tendency to break out the last material during the application of lasting pressure thereto.

These objects and other more detailed objects hereafter appearing are obtained by the device illustrated in the accompanying drawing in which Fig. 1 is a side view of the last in its normally functioning position.

Figure 1:
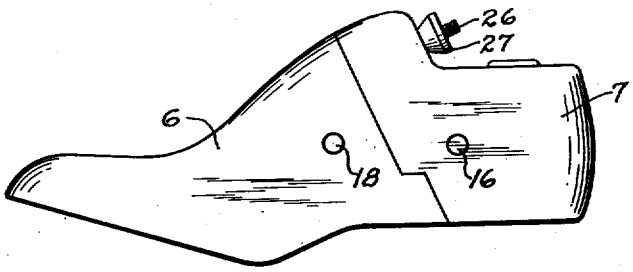
Figure 2:
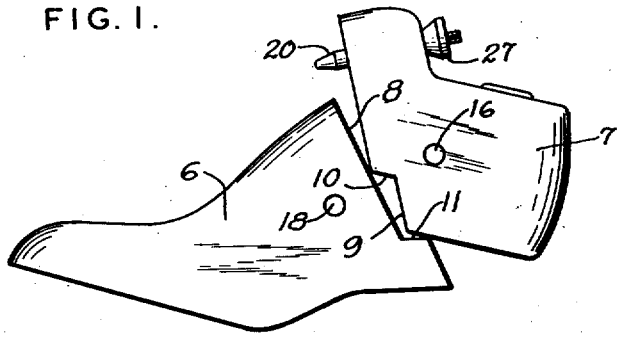
Fig. 2 is a similar view, but showing the toe and heel parts swiveled and collapsed to permit removal of the last from the shoe upper.
Figure 4:
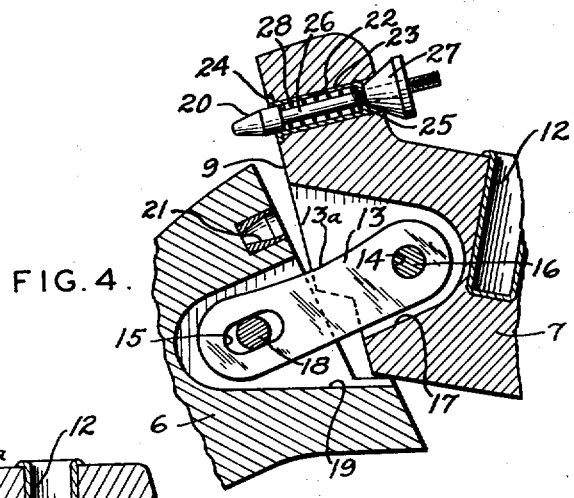
Fig. 4 is a view similar to Fig. 3 but showing the toe and heel parts swiveled.

The last comprises, generally, a toe part 6 and a heel part 7 which meet along complementary abutting surfaces 8 and 9, respectively. These faces or surfaces are inclined at an angle between the longitudinal axis of the last and the transverse axis. The intermediate portions of surfaces 8 and 9 are provided with transverse or stepped portions 10 and 11 which engage, in the normal position of Fig. 1, to prevent further downward swivelling of the heel part about the toe part.

An orifice 12 with a metal liner extends downwardly into the center portion of the heel part 7 for receiving a mounting pin on the lasting stand. The toe and heel parts are swivelly connected by a single, heavy, non-extensible link 13 which has a circular aperture 14 in its heel end and a slotted aperture 15 in its toe end. A pivot pin 16 is mounted in the walls of and extends across a slot 17 in the heel part and fits closely within aperture 14. A second pivot pin 18 is mounted in the walls of and extends across a complementary slot 19 in the toe part and is received within slotted aperture 15 of the link. Apertures 14 and 15 are positioned so that in the normal position of the last, the toe and heel parts are held solidly against elongation with surfaces 8 and 9 and stepped portions 10 and 11 in engagement. The upper edge of link 13 is slightly concaved as at 13*a* so that less wood need be removed from the upper surface of the complementary slots with consequent strengthening of the last.

Upward swivelling of the heel part is normally prevented by a detent pin having an enlarged, tapered, lower portion 20 which in its projected position closely fits a correspondingly shaped orifice 21 in the toe part and provided with a metal liner. The detent pin is mounted within an orifice 22 in the heel part provided with a sleeve 23 tightly lodged therein. This sleeve has a small flange 24 resting against and flush with abutting surface 9 of the heel part and, at its upper end has an internal apertured shoulder 25 spaced inwardly from the outer edge of orifice 22. The detent pin has a reduced, intermediate portion 26 which closely, but slidably fits apertured shoulder 25 and is threaded at its outer extremity to receive a knurled handle enlargement 27. The lower face of enlargement 27 is conically shaped and, in the normal position of the parts, rests against the upper edge of orifice 22 to limit the downward projection of the detent pin and aid in centering the same. A small coiled spring 28 is compressed between apertured shoulder 25 and the enlarged lower part 20 of the detent and urges the pin toward its projected position.

Figure 3:
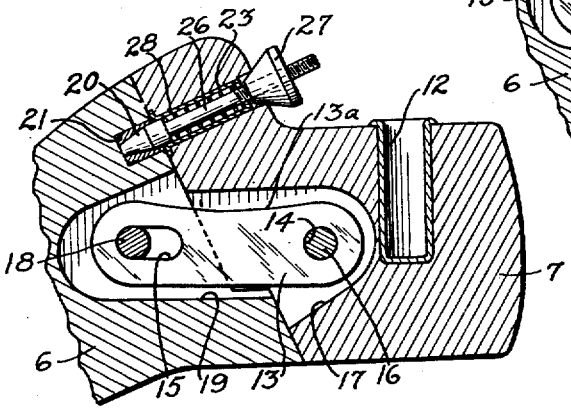
Fig. 3 is a partial, enlarged vertical longitudinal section through the swivelling and latching parts.

When the parts are in their normal functioning positions, as in Figs. 1 and 3, tapered detent 20 closely and accurately fits within the extremity of lined orifice 22 and in tapered recess 21 as to prevent play between the toe and heel parts and hold the parts solidly assembled. Recess 21 and orifice 22 are accurately aligned and extend substantially at right angles to the abutting surfaces of the last parts. Both the detent and link elements are well adapted for assembly with lasts made in a variety of shapes and sizes. The provision of the slot 14 in the forward or toe end of the link permits pivot pin 15 to be mounted within the heel part at a point spaced sufficiently inwardly of surface 9 thereof to provide adequate material between the pin and the abutting surface and, consequently, maximum strength in this part. This is important because of the provision of mounting orifice 12 which limits the available space within the heel part. On the other hand, slot 19 in the toe part may be made sufficiently deep for adequate strength of the material between pivot pin 18 and abutting surface 8 and to permit forward sliding of the link incident to the swivelling action to collapse the last. The link is non yielding, accurate, and durable as is the detent enlargement so that the last is of exceptional strength in its functioning position, yet may be easily and quickly collapsed by the operator to permit withdrawal of the last from the shoe without stretching.

The tapered detent and its latching recess insure firm locking of the last parts.

The invention may be modified as will occur to those skilled in the art and the exclusive use of all modifications as come within the scope of the appended claims is contemplated.

We claim:

1. A collapsible shoe last comprising separable toe and heel parts having complementary abutting surfaces inclined between the longitudinal and transverse axes of the last, a last-mounting orifice projecting transversely into said heel part from its upper surface, longitudinal depressions in said surfaces, a swivel link connecting said parts and projecting into said depressions, said link having a slotted aperture in the toe end and a round aperture in heel end thereof, pivot pins extending through said apertures and said parts and substantially spaced inwardly of said abutting surfaces for adequate reinforcement against breakage of the last material during lasting, said abutting surfaces having stepped portions for limiting swivelling of said parts in one direction from their normal, functioning positions and said link preventing longitudinal separation of said parts when in said position, a pair of normally aligned orifices in said parts spaced from said depressions and extending from the upper surface of said heel part and intersecting said surfaces at substantially 90° thereto, a lining sleeve firmly lodged in said heel part orifice and having an internal, apertured shoulder spaced inwardly from the outer edge of said heel part orifice, and a detent pin having an enlarged lower part normally closely fitting the adjacent portions of said aligned orifices, a reduced intermediate portion slidably guided by said apertured shoulder, and an enlarged, conical handle portion for seating against said upper edge of said last mentioned orifice to limit the projection of and to center said detent pin in its extended position.

2. A shoe last having separable toe and heel parts with abutting surfaces, a rigid, swivel link connecting said parts, said surfaces limiting the swivelling of said parts in one direction to their normal, functioning positions, normally aligned orifices in said parts opening through said surfaces, one of said orifices being tapered, and a tapered detent resiliently mounted in the other orifice and normally seated in said first orifice for latching said parts in said normal position, said detent having at least two longitudinally separate bearings in said second orifice and closely fitting said first orifice for firmly maintaining said parts in said normal position against the lasting pressures applied thereto.

3. A collapsible shoe last comprising toe and heel parts having abutting surfaces inclined between the vertical and transverse axes of the last, a swivel link connecting said parts and having a pivotal connection to each of the same, said surfaces having complementary, stepped portions for positively limiting swivelling of said parts in one direction from their normal, functioning positions, normally aligned orifices in said parts intersecting said abutting surfaces at an angle of substantially 90°, one of said orifices being tapered, a sleeve lodged in the other orifice and terminating in an apertured shoulder spaced inwardly from the outer edge thereof, and a detent pin having a tapered, lower portion normally closely fitting said tapered orifice, an adjacent cylindrical portion closely fitting the extremity of said sleeve, an intermediate reduced portion slidably fitting said apertured shoulder, and a projecting handle portion.

4. A last as described in claim 3 further including a spring compressed between said apertured shoulder and said lower portion of said detent pin.

5. A last as described in claim 4 further including a tapered enlargement on the projecting end of said detent pin for seating against the outer edge of the detent receiving orifice to limit the projection of and to center said detent pin.

*6. In combination with a shoe last having separable toe and heel parts, a latching device mounted on the last and comprising a sleeve lodged in one of said parts and with an internal shoulder at one end forming a reduced aperture, a detent pin extending longitudinally through and oppositely beyond said sleeve, said pin having portions snugly received and slidable in said aperture and the opposite end of said sleeve, a spring stressed between said pin and said sleeve and normally urging said pin to its extended, latching position beyond said opposite end of said sleeve, and a handle enlargement on said pin outwardly of said internal shoulder having a conical inner surface facing said shoulder for bearing against the last to limit projection of and aid in centering said pin.*

*7. The combination with a two part shoe last of a latching device mounted on the last and comprising a sleeve lodged in one of said parts and with an internal shoulder at one end forming a reduced aperture and an external shoulder at the other end for seating against the last, a detent pin extending longitudinally through and oppositely beyond said sleeve, said pin having an intermediate portion and an enlarged end portion, respectively, snugly fitting and slidable in said reduced aperture and said externally shouldered end of said sleeve, said enlarged end portion being cylindrical with a tapered outer extremity, a coiled spring stressed between said enlarged end of said pin and said internal shoulder of said sleeve, and a handle enlargement on*

*said pin outwardly of said internal shoulder and having a conical inner surface facing said shoulder for bearing against the last to limit projection of said pin and aid in centering the same.*

*8. The combination described in claim 7 further including a recessed member for lodgment in the opposite part of the last and for receiving said enlarged end portion of said detent pin, said recessed member having a cylindrical portion and tapered inner wall closely conforming with the correspondingly shaped, enlarged end portion*

*of said pin for snugly engaging the side and end walls of said end portion.*

ESKEL J. McDANIEL.
ARTHUR R. SUMMERS.

REFERENCES CITED

The following references are of record in the file of this patent or the original patent:

UNITED STATES PATENTS

| Number | Name | Date |
|---|---|---|
| 2,405,942 | Clausing | Aug. 20, 1946 |